(12) United States Patent
Othon

(10) Patent No.: US 11,227,366 B2
(45) Date of Patent: Jan. 18, 2022

(54) HEADS UP DISPLAY (HUD) CONTENT CONTROL SYSTEM AND METHODOLOGIES

(71) Applicants: VOLKSWAGEN AG, Wolfsburg (DE); PORSCHE AG, Stuttgart (DE); AUDI AG, Ingolstadt (DE)

(72) Inventor: Adrienne Othon, Kensington, CA (US)

(73) Assignee: Volkswagen AG

( * ) Notice: Subject to any disclaimer, the term of this patent is extended or adjusted under 35 U.S.C. 154(b) by 199 days.

(21) Appl. No.: 16/015,859

(22) Filed: Jun. 22, 2018

(65) Prior Publication Data

US 2019/0392562 A1 Dec. 26, 2019

(51) Int. Cl.
| | | |
|---|---|---|
| G06T 5/00 | (2006.01) | |
| G01S 17/86 | (2020.01) | |
| B60R 1/00 | (2006.01) | |
| G02B 27/01 | (2006.01) | |
| G06T 5/50 | (2006.01) | |

(52) U.S. Cl.
CPC ............ G06T 5/003 (2013.01); B60R 1/00 (2013.01); G01S 17/86 (2020.01); G02B 27/0101 (2013.01); G06T 5/009 (2013.01); G06T 5/50 (2013.01); B60R 2300/205 (2013.01); B60R 2300/301 (2013.01); B60R 2300/308 (2013.01); G02B 2027/014 (2013.01); G02B 2027/0138 (2013.01); G06T 2207/10028 (2013.01); G06T 2207/30252 (2013.01)

(58) Field of Classification Search
None
See application file for complete search history.

(56) References Cited

U.S. PATENT DOCUMENTS

| | | | |
|---|---|---|---|
| 7,995,060 B2 | 8/2011 | Murrah et al. | |
| 9,824,490 B1 | 11/2017 | Côté | |
| 2002/0130953 A1* | 9/2002 | Riconda | G01C 21/36 348/115 |
| 2015/0288948 A1* | 10/2015 | Schamp | B60R 1/00 348/47 |
| 2016/0109701 A1* | 4/2016 | Goldman-Shenhar | G02B 27/01 345/8 |
| 2017/0234976 A1* | 8/2017 | Grauer | G01S 17/89 356/5.04 |
| 2018/0031384 A1* | 2/2018 | Lee | G01C 21/3602 |

(Continued)

FOREIGN PATENT DOCUMENTS

WO 2006120489 A1 11/2006

OTHER PUBLICATIONS

Gulfstream; Enhanced Vision System; downloaded from http://www.gulfstream.com/product-support/product-enhancements/enhanced-vision-system and http://www.gulfstream.com/technology/vision-systems; downloaded Jun. 22, 2018; published as early as Nov. 20, 2017.

(Continued)

Primary Examiner — Heather R Jones
(74) Attorney, Agent, or Firm — Barnes & Thornburg LLP

(57) ABSTRACT

A system and methodologies for controlling the content of a heads up display to provide increased visibility of naturally occurring contours and surfaces in the environment is provided. Depth information is provided along with predefined lighting conditions in order to output an image by the HUD with enhanced feature contours.

19 Claims, 3 Drawing Sheets

(56) References Cited

U.S. PATENT DOCUMENTS

2019/0084419 A1* 3/2019 Suzuki .................. G09G 3/346

OTHER PUBLICATIONS

Wikipedia; Synthetic Vision System; downloaded from https://en.wikipedia.org/wiki/Syngthetic_vision_system; downloaded Jun. 22, 2018; published as early as Nov. 20, 2017.
Search Report and Written Opinion for International Patent Application No. PCT/EP2019/066134; dated Oct. 11, 2019.

* cited by examiner

HEADS UP DISPLAY (HUD) CONTENT CONTROL SYSTEM AND METHODOLOGIES

BACKGROUND

The present disclosure relates to systems, components, and methodologies for augmenting driver views. In particular, the present disclosure relates to systems, components, and methodologies that perform image contouring and project the contoured image in alignment with the naturally-occurring view to enhance visibility of features in the view.

SUMMARY

According to the present disclosure, systems, components, and methodologies are provided for controlling a HUD to increase visibility within a driver's field of view.

In accordance with disclosed embodiments, structure and software are provided for controlling a HUD so that the display projects an enhanced contoured image of the naturally occurring field of view or portion of a field of view outside a vehicle. The enhanced contoured image may be a product of depth information, lighting conditions, and features in the field of view.

In accordance with at least one embodiment, the depth information is sensed using Laser Imaging, Detection and Ranging (LIDAR) and is formatted as a depth image. The features in the field of view may be captured by a camera. The lighting conditions may be, for example, specular, diffuse or ambient occlusion, and may be calculated using the normal vectors, which are calculated from the depth image.

In accordance with at least one embodiment, the lighting conditions may be determined based on the vehicle trajectory, the time of day, and/or the day of the year. The light-contoured image may be projected by a HUD in response to flat or low lighting conditions, or rain being sensed. The HUD and a processor may be integrated in a vehicle to communicate with various vehicle sensors and inputs via a communications bus.

Additional features of the present disclosure will become apparent to those skilled in the art upon consideration of illustrative embodiments exemplifying the best mode of carrying out the disclosure as presently perceived.

BRIEF DESCRIPTION OF FIGURES

The detailed description particularly refers to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1:
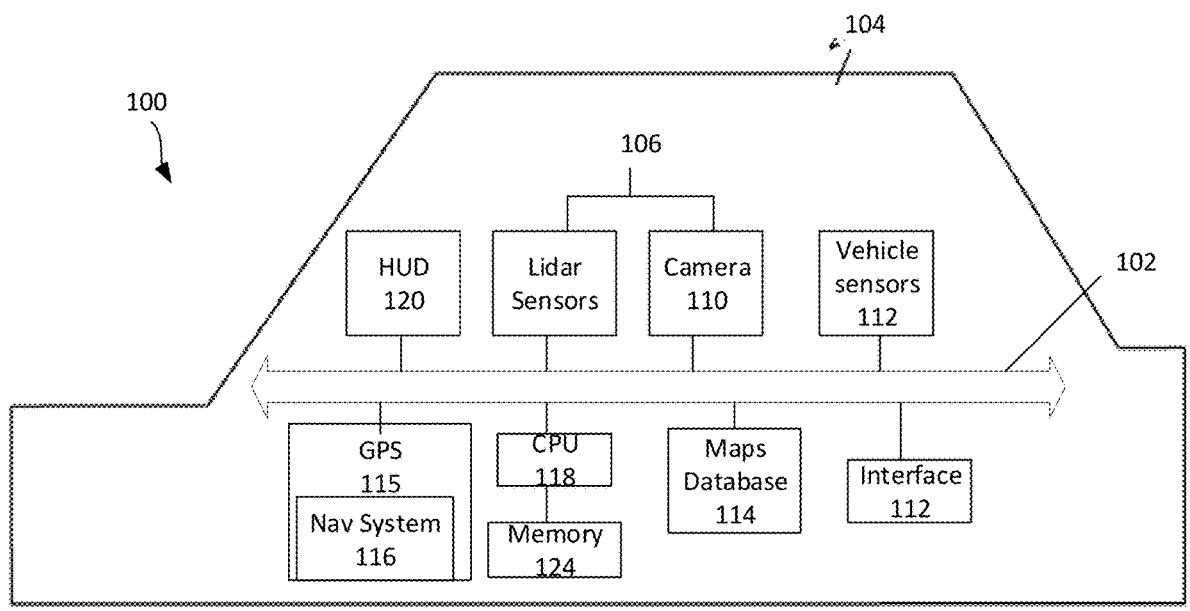
FIG. 1 is an block diagram of hardware structure and software utilized by disclosed embodiments to provide a naturally augmented view in a HUD.

In illustrative embodiments, an example of which being illustrated in FIG. 1, structure and software are provided for a HUD content control system 100 for improving, augmenting or enhancing visibility of a naturally occurring view outside of a vehicle. The HUD system 100 is illustratively embodied as integrated into a communications bus 102 of a vehicle 104. The HUD system illustratively includes one or more sensors 106, embodied to include sensors configured to sense the geography of features outside the vehicle. A camera 110 may also be provided to capture images of the geography outside of the vehicle. Processor 118 may receive information from the sensors 106, process the information, and control outputs to a HUD 120 onto a vehicle windshield. Processor 118 may further be provided with local memory 124 for storage of commands, historical sensed data, and/or generated HUD outputs. The vehicle may further include a database 114 of maps, a navigation system 116 and further vehicle sensors 112 that may communicate with the processor 118. For the, the HUD will be described and positioned in terms of the field of view of a driver and windshield of the vehicle 104. However, the system may generate multiple different displays at multiple different viewpoints for passengers within the vehicle individually, or simultaneously at different windows and views as can be seen from the vehicle.

The system 100 illustratively includes one or more sensors 106, embodied to include at least one LIDAR sensor, for receiving range data indicative of the distance between the vehicle and various points in the view from the windshield. The vehicle may further include a database 114 of maps, a GPS unit 115 and navigation system 116 and further vehicle sensors 112, such as compass, weather, and speed sensors, or input interface 112, such as an infotainment touchscreen, which may communicate with the processor 118. For illustrative purposes, the HUD will be described and positioned in terms of the viewpoint of a driver and windshield of the vehicle 104. However, the HUD system may generate and project multiple different displays at multiple different viewpoints within the vehicle individually, or simultaneously.

Figure 2:
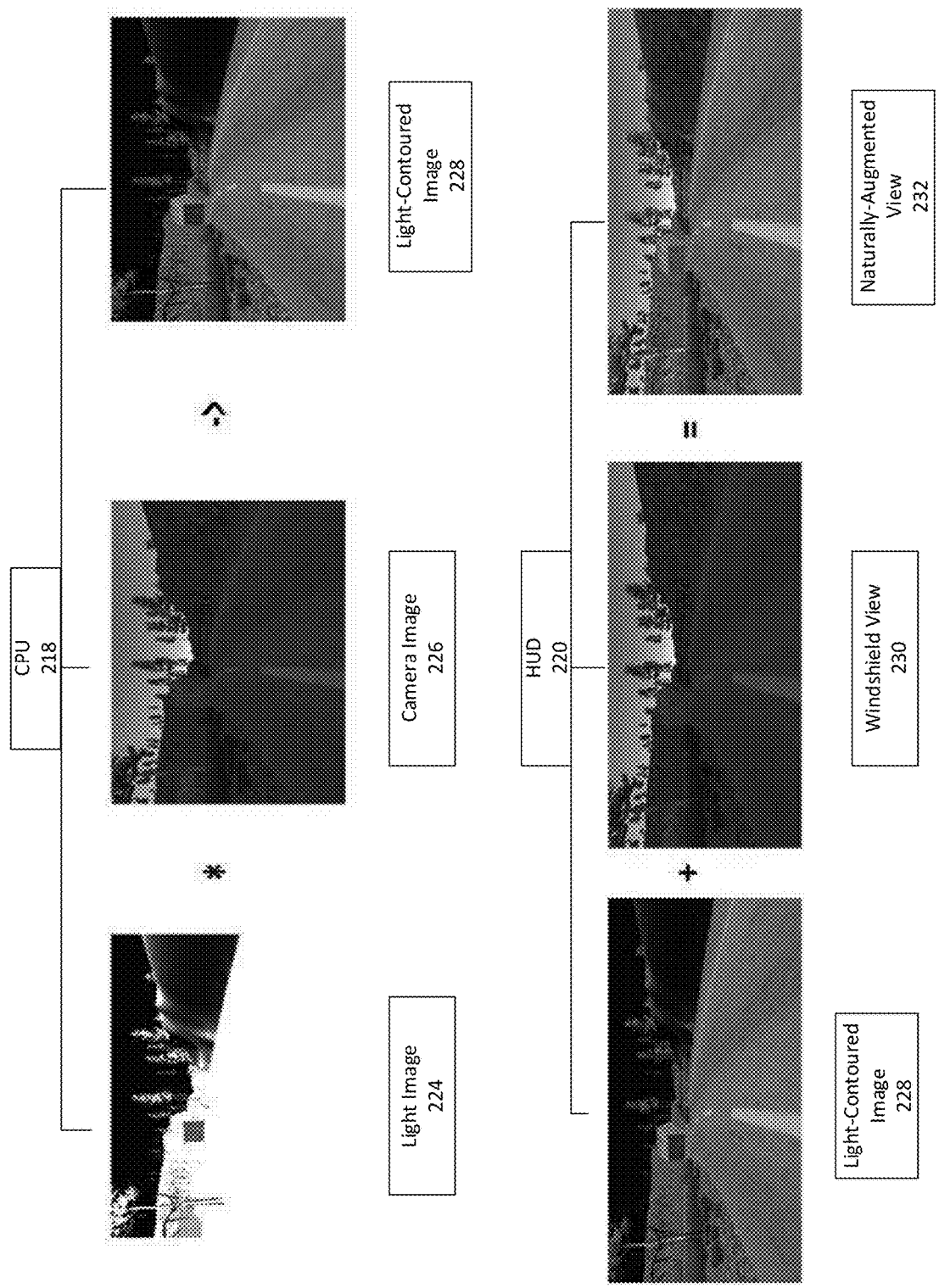
FIG. 2 is a diagram of the manipulation of various image data and projection and alignment of the manipulated data on a windshield view to provide a naturally augmented view in a HUD.
Figure 3:
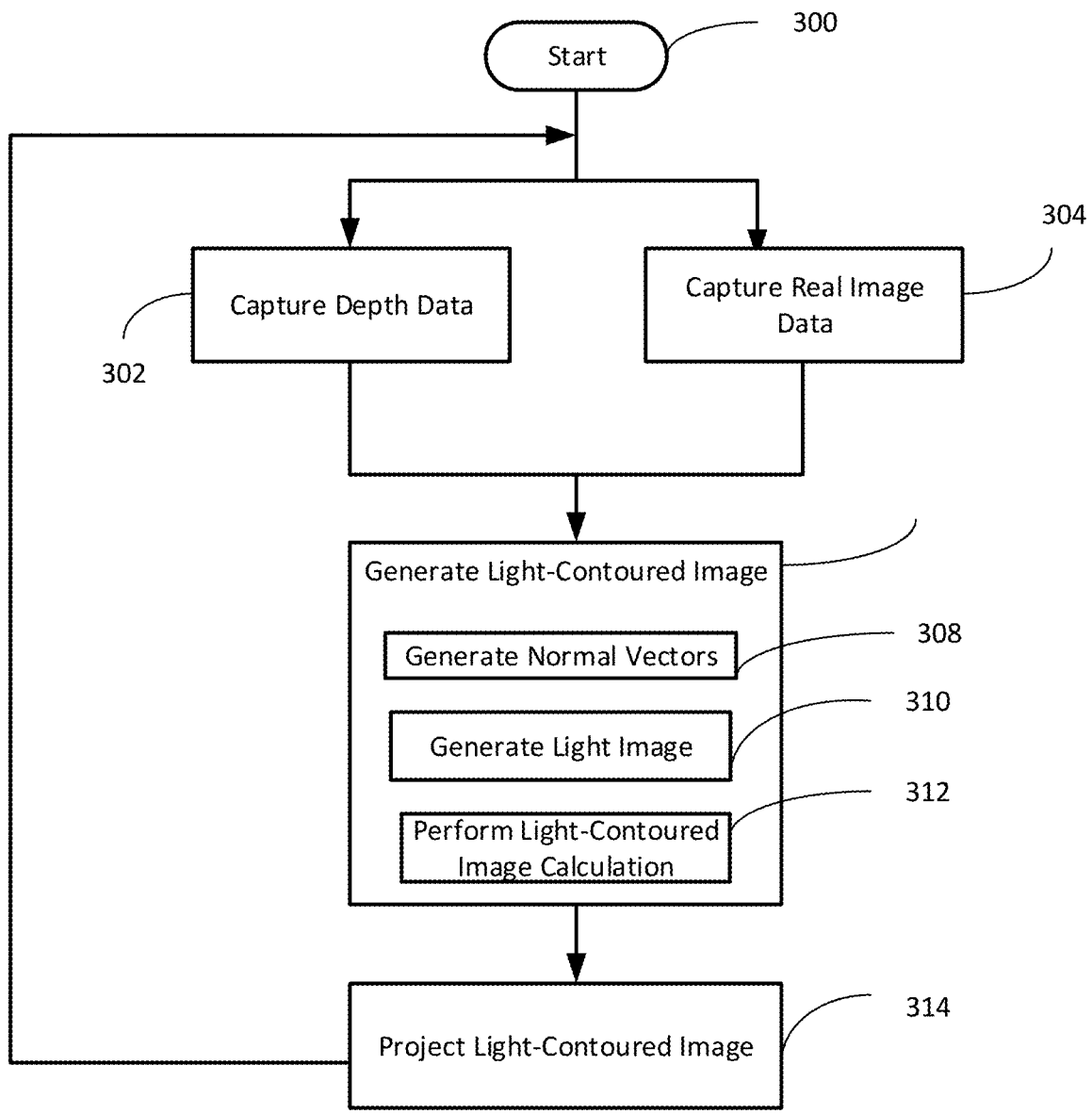
FIG. 3 is a flow diagram method of generating a naturally augmented view.

As seen in FIG. 2, the processor 218 may be a graphical processing unit (GPU) and may process a light image 224 and a camera image 226 of a windshield field of view during flat lighting conditions to generate a light-contoured image 228. The light-contoured image 228 may be communicated to the HUD 220. The HUD may project the light-contoured image 228 onto the windshield, and the corresponding windshield view 230 so that the light-contoured image 228 is aligned with the actual windshield view 232, thereby resulting in a naturally augmented view 232.

A method for generating a naturally augmented view in real-time, may start 300 via manual driver input, for example at the vehicle interface such as the center console or infotainment interface. Additionally, the process may be programmed to automatically start when low lighting conditions are sensed, and/or when vehicle headlights are illuminated. Depth data 302 of a view in front of a vehicle may be captured, and simultaneously real image data 304 of the view in front of the vehicle may be captured. Depth data may be captured, for example, using LIDAR or other depth sensors. Depth data may be captured into an image formatted buffer as a depth image, and then image processed to provide information about geometric shape of the view in front of the vehicle. Real image data may be captured using a camera or using a map image database, such as GOOGLEEARTH™, HERE™ maps or other street view mapping databases, along with current geo-location and orientation information for the vehicle, which may be provided for example, via a vehicle navigation system.

A light-contoured image may be generated 306 using the depth data and the real image data. First, normal vectors for each pixel of the geometry shape, or feature, within the depth image may be determined 308. In order to compute the normal vector at the geometry surface at each pixel, first tangent vectors on the surface are computed. Then the cross product of the tangent vectors generates the normal vector. At each pixel in the depth image, the vectors from the camera to the geometry are computed in the directions of the four pixels adjacent to the current pixel. Then a difference vector is calculated using two adjacent horizontal pixel vectors. Normalization of this difference vector may be used as an estimate for the horizontal tangent vector on the geometry surface of the current pixel. This process may be repeated for the two adjacent vertical pixels to determine an estimate for the vertical tangent vector. The normal vector may then be determined for the pixel as the cross product of the horizontal and vertical tangent vectors. An example of this normal vector processing is provided in further detail below.

The depth image space may be defined in terms of the camera view space in order to calculate each normal from the camera to the geometry. The z-axis may be defined to be along the camera aim direction, positive z is from the scene toward the camera, x-axis in the horizontal direction when viewing the depth image, positive x is right, y-axis vertical, positive y is up. Therefore, using the standard perspective projection of the CG camera, a unit vector from the camera to pixel x,y may be computed as:

$$\text{unitVectorToPixel}(x,y) = \text{Normalize}((x+0.5-\text{width}/2)/(\text{width}/2)*\tan(\text{fov}Y/2)*\text{aspect}, (y+0.5-\text{height}/2)/(\text{height}/2)*\tan(\text{fov}Y/2), -1)$$

where fovY=field of view angle in the Y (vertical) direction, width=width in pixels of the depth image, height=height in pixels of the depth image, aspect=width/height, and y and y are the pixel coordinates ranging from [0 . . . width−1] and [0 . . . height−1], respectively. The vectors are calculated through the center of each pixel by the addition of 0.5 to each of the x and y coordinate values.

Using the depth value at the x,y pixel, the point at the nearest geometry at pixel x,y is:

$$\text{PointOnGeometryAtPixel}(x,y) = \text{Depth}(x,y)*\text{unitVectorToPixel}(x,y)$$

Using the PointOnGeometryAtPixel formula above, the system may compute the vectors to the geometry at the current pixel and four adjacent horizontal and vertical pixels.

Compute the horizontal and vertical tangent vectors at the geometry surface for the current pixel by subtracting the vectors to the geometry at the adjacent horizontal and vertical pixels:

$$\text{tangent}H = \text{PointOnGeometryAtPixel}(x+1,y) - \text{PointOnGeometryAtPixel}(x-1,y)$$

$$\text{tangent}V = \text{PointOnGeometryAtPixel}(x,y+1) - \text{PointOnGeometryAtPixel}(x,y-1)$$

Finally, the normal vector may be computed as the cross product of the tangent vectors:

$$\text{Normal} = \text{Normalize}(\text{Cross}(\text{tangent}H, \text{tangent}V))$$

Using the determined normal vector data, along with information regarding light direction, a lighting calculation may be performed to generate a light image 310. For example, the cosine of the angle between the light direction and the normal direction may be used to generate a diffuse lighting light image. Light direction information may be stored locally and be correlated to one or more of date, time of day, and compass orientation, or may be sensed by sensors integrated in the vehicle.

Finally, the light-contoured image may be calculated by combining the light image and the original captured image. The product of the light image and the originally captured image may be determined 312 in order to generate the light-contoured image 306. Next the image light-contoured image may be projected to overlay and align with the real-time view through the windshield 314 generating a naturally augmented view. In the naturally augmented view, or enhanced view, the contours of the features in front of the vehicle are realistically sharpened using natural lighting and contrast to enhance the driver's view. This process may be repeated and updated as the view through the windshield changes and updates while operating the vehicle. Still further, lighting conditions such as specular, diffuse, backlighting, or particularly associated time-of-day lighting may be stored in a local memory and may be applied according to driver or user preference.

Although the method was described using diffuse lighting techniques, specular lighting may also be used along with sensed driver gaze data in order to provide directional lighting and realistic light glints in the view. Still further, backlighting may be used in order to enhance mood and create a perception of "driving towards the light." Cinematic lighting, for example, may be used to further exaggerate or enhance contours, direct the eye, and enhance mood Cinematic lighting usually implies creative interpretation, but often makes use of a standard 3 point lighting setup which consists of 3 lights, a key light which is the brightest light, illuminating from a side angle of approximately 45 to 60 degrees, a darker fill light illuminating from the opposite side and illuminating areas shadowed from the key light, and a back light illuminating from behind the subject, toward the camera, creating an illuminated rim type appearance on the subject.

The depth image space was defined in terms of camera space. However, in some embodiments, the values computed in camera space may be transformed to other spaces such as world space using a camera-to-world matrix.

According to an alternative embodiment, the LIDAR depth data may be represented as a point cloud format, and the normals may be calculated directly from the point cloud. Existing libraries such as pointclouds.org may be used to calculate the normal vectors from the point cloud data. This calculation will generally employ principal component analysis on neighboring points to obtain the minor eigenvector, representing the normal. The two major eigenvectors represent tangent vectors lying on the surface of the geometric feature in the view.

Low light driving conditions lead to low contrast imagery, with flat or unnatural lighting viewed by the driver. This may cause decreased situational awareness, erroneous interpretation, or response time delay while operating a vehicle as the driver is unable to see features including potholes, road curvature, contour and terrain. Headlights during night or dark conditions create tunnels of visibility and a lack of awareness of surroundings and the horizon. Available HUD systems simply add unnatural graphics and icons to the driver's view, thereby obscuring the view and distracting the driver.

The[DR1] disclosed HUD system is configured to improve the visibility of features in the field of view to a driver. This is achieved by automatically sensing the features, processing their contours, and projecting contour enhancement images that align with contours of features in the field of view. In this manner the HUD system enhances naturally occurring contours of features in the field of view using realistic lighting to improve driving safety. The system avoids adding additional graphics or icons to the projection output onto the field of view in order to identify these features, which may obscure the field of view or distract the driver. By augmenting what the driver sees using natural lighting cues, driving conditions are enhanced realistically. This augmented realism permits contour information about the imagery presented to the driver to be manipulated to compensate for poor lighting, weather, and time of day. This allows the driver to view optimal driving conditions even when it is dark, raining, or otherwise more difficult to see while driving.

It should be understood that some or all of the methodology explained above may be performed on, utilizing, or with access to, one or more servers, processors and associated memory. Unless specifically stated otherwise, and as may be apparent from the above description, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to a GPU or any device or portion of a device that processes electronic data from registers and/or memory to transform that electronic data into other electronic data that may be stored in registers and/or memory.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

The invention claimed is:

1. A system for enhancing the visibility of features in a driver field of view in real-time, the system comprising:
   a camera configured to capture an image including features in the driver field of view,
   at least one depth sensor configured to capture depth data in the driver field of view, and
   a processor running software for generating a light-contoured image from the captured image and the depth data and overlaying and aligning the light-contoured image on the driver field of view so that the visibility of contours of the features in the driver field of view are enhanced,
   wherein at least one depth sensor comprises a LIDAR sensor configured to capture depth data and convert the data to depth images in frames in an image formatted buffer, wherein each frame corresponds to an image captured by the camera,
   wherein the processor running software is further configured to image process a depth image using a preselected lighting condition by applying a lighting calculation to the depth image to create a light image,
   wherein normal vector data are determined for pixels of the features within the depth image, and
   wherein the lighting calculation comprises using the determined normal vector data, along with information regarding light direction, to create the light image.

2. The system of claim 1, wherein the processor is in communication with a heads up display (HUD) unit.

3. The system of claim 1, wherein the preselected lighting condition may be one of a diffuse, specular, backlit, cinematic, or artistic lighting condition.

4. The system of claim 3, wherein the cosine of the angle between the light direction and a normal direction corresponding to the normal vector data is used to generate a diffuse lighting light image.

5. The system of claim 1, wherein the processor running software is configured to combine the light image with a corresponding captured camera image in time to generate the light-contoured image.

6. The system of claim 1, wherein the information regarding light direction is stored locally and is correlated to one or more of date, time of day, and compass orientation, or is sensed by sensors integrated in the vehicle.

7. A transportation vehicle comprising:
   at least one depth sensor configured to capture depth data of the geography or environment outside the transportation vehicle,
   a processor configured to generate a light-contoured image from the captured depth data and image data that includes features in a driver's field of view, and
   a heads up display (HUD) configured to project the light-contoured image on a window of the transportation vehicle and align the light-contoured image with the driver's field of view to increase the contrast and visibility of the contour of features of the image in the driver's field of view,
   wherein at least one depth sensor comprises a LIDAR sensor configured to capture depth data and convert the data to depth images in frames in an image formatted buffer, wherein each frame corresponds to an image captured by a camera,
   wherein the processor is further configured to image process a depth image using a preselected lighting condition by applying a lighting calculation to the depth image to create a light image,
   wherein normal vector data are determined for pixel of the features within the depth image, and
   wherein the lighting calculation comprises using the determined normal vector data, along with information regarding light direction, to create the light image.

8. The transportation vehicle of claim 7, further comprising a camera, wherein the camera generates the image data.

9. The transportation vehicle of claim 7, further comprising a map database, wherein the map database generates the image data.

10. The transportation vehicle of claim 7, wherein the processor is further configured to receive information from a transportation vehicle communications bus including time of day and direction of travel, and a lighting direction so the light-contoured image is generated based on time of day data and direction of travel data.

11. The transportation vehicle of claim 10, wherein the processor is further configured to generate the light-contoured image based on any of predetermined lighting conditions including diffuse, specular, backlit, cinematic, or artistic lighting conditions.

12. The transportation vehicle of claim 11, wherein the processor is configured to start generating the light-contoured image in response to one of user input, sensed environmental conditions outside the transportation vehicle, or vehicle headlights illuminating.

13. The transportation vehicle of claim 7, wherein the at least one depth sensor is a LIDAR sensor.

14. The transportation vehicle of claim 13, wherein the LIDAR sensor captures depth data as depth image frames or a point cloud format.

15. A method for increasing visibility of features in a driver field of view comprising:
   capturing an image of the field of view including features,
   sensing depth of the features in a field of view simultaneously with the image capture,
   wherein the image in the field of view is captured by a camera and the depth of features are sensed by at least one LIDAR sensor as a depth image, the depth image containing distances from the camera to the nearest geometry along each vector from the camera through each pixel,
   applying a lighting calculation to the depth image to create a light image,
   wherein normal vector data are determined for pixel within the depth image, and
   wherein the lighting calculation comprises using the determined normal vector data, along with information regarding light direction, to create the light image,
   processing the light image and the captured image to generate a contoured image, and
   projecting the contoured image onto the field of view to align the contoured image with the field of view so that contours of the features in the field of view are enhanced.

16. The method of claim 15, wherein the applying a lighting calculation further comprises applying a lighting condition to the sensed data selected from one of diffuse lighting, specular lighting, backlighting, cinematic, or artistic lighting.

17. The method of claim 15, wherein in the alignment of the contoured image with the field of view results in an overall augmented view having realistic lighting conditions.

18. The method of claim 17, wherein in the alignment of the contoured image with the field of view results in an overall augmented view having cinematic lighting conditions.

19. The method of claim 15, wherein the contoured image is processed and updated in real-time to align with the updated field of view as the vehicle moves.

* * * * *